Figure 2:
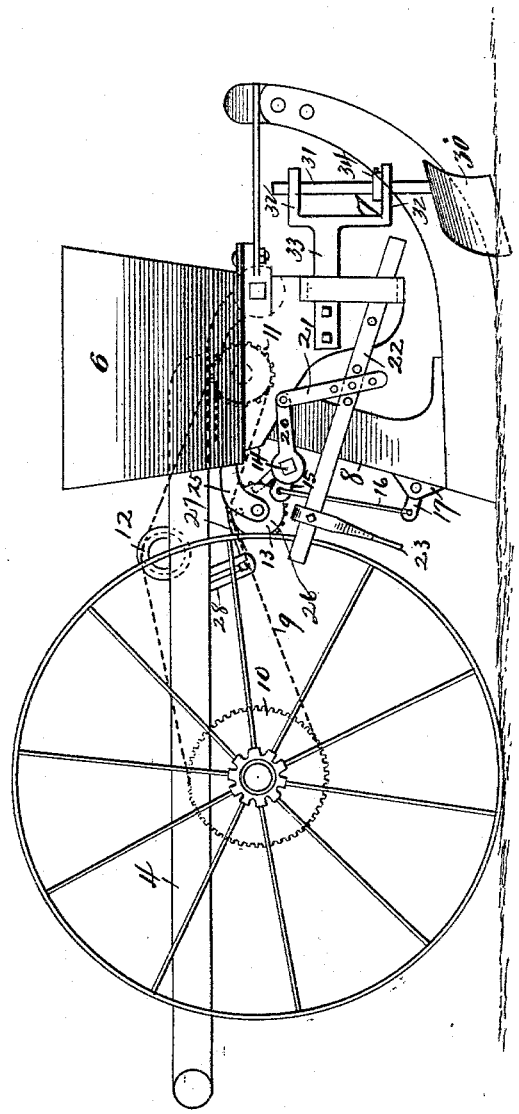

(No Model.) 2 Sheets—Sheet 1.
H. W. DEUTSCHER.
CHECK ROW ATTACHMENT FOR SEED PLANTERS.
No. 597,353. Patented Jan. 11, 1898.
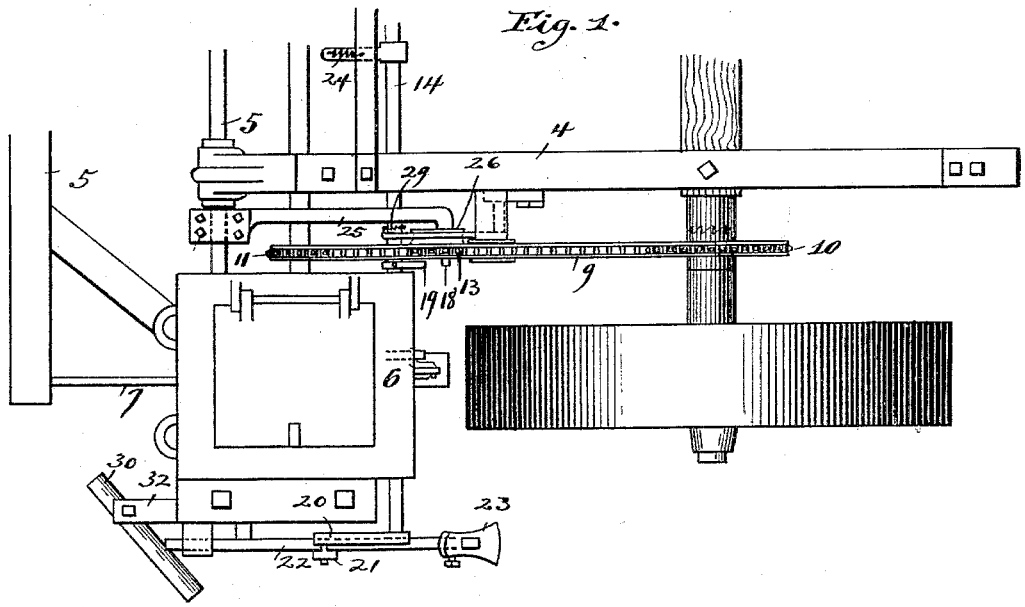
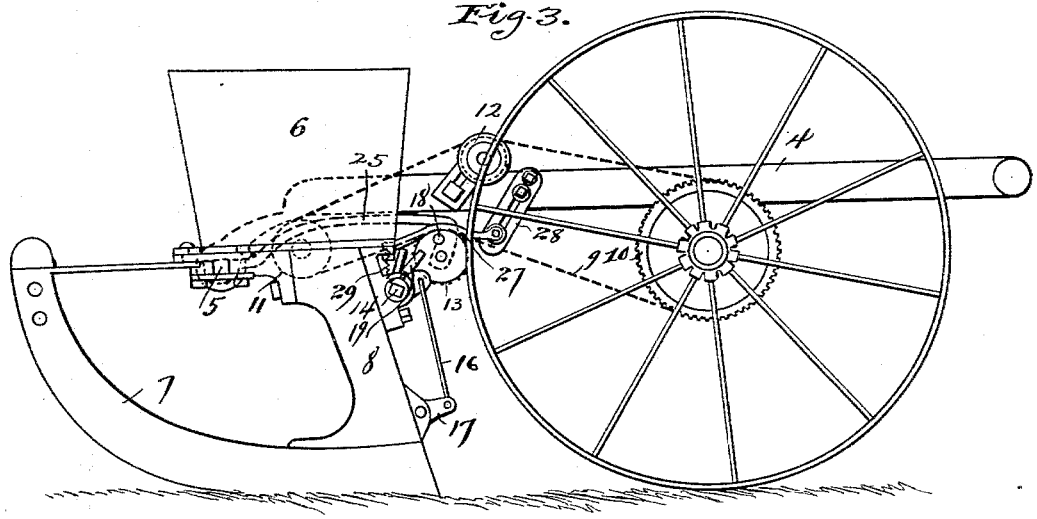
Witnesses,
S. S. Mann
Frederick F. Goodwin
Inventor,
Henry William Deutscher
By Offield, Towle & Linthicum
Attys.

(No Model.) 2 Sheets—Sheet 2.

H. W. DEUTSCHER.
CHECK ROW ATTACHMENT FOR SEED PLANTERS.

No. 597,353. Patented Jan. 11, 1898.

Witnesses,
Inventor,
Henry William Deutscher

UNITED STATES PATENT OFFICE.

HENRY WILLIAM DEUTSCHER, OF BONDVILLE, ILLINOIS, ASSIGNOR TO FRANZ H. DEUTSCHER, OF SAME PLACE.

CHECK-ROW ATTACHMENT FOR SEED-PLANTERS.

SPECIFICATION forming part of Letters Patent No. 597,353, dated January 11, 1898.

Application filed October 22, 1896. Serial No. 609,679. (No model.)

*To all whom it may concern:*

Be it known that I, HENRY WILLIAM DEUTSCHER, of Bondville, Illinois, have invented certain new and useful Improvements in Check-Row Attachments for Seed-Planters, of which the following is a specification.

This invention relates to an attachment to be applied to seed-planters for the purpose of enabling the seed to be dropped in rows transversely of the direction of movement of the planter and is intended to take the place of those check-row attachments and devices which are actuated by a knotted wire or a cord stretched across the field.

The attachment consists in marking devices which are actuated by a rotating part of the machine at regular intervals, so as to produce visible marks in the surface of the soil, capable of serving as guides for starting the planter at either end of the field and by means of which when the first hill is dropped in line with the transverse rows previously planted the same distances will intervene between succeeding hills across the field and a perfect check-rowing thereby result.

My invention may be embodied in various forms of mechanism, a simple form being shown in the accompanying drawings, in which—

Figure 1 is a partial plan view; Fig. 2, a side view showing the marker; and Fig. 3, an opposite side view, the marking device being omitted, but showing a part of its actuating mechanism.

In the accompanying drawings I have shown my invention as applied to a planter of ordinary construction, in which 4 represents the wheel-frame, and 5 the runner-frame, the latter carrying the seed-hoppers 6 and provided with runners 7, having seed-tubes 8. As arranged the dropping is effected by means of the sprocket-chain 9 running over the sprocket-gear 10 on the wheel or main shaft and over a sprocket 11 on the seed-disk shaft, the strands of the chain passing over an intermediate sheave 12 and the sprocket 13. Mounted in suitable bearings in the rear of the seed-tube shaft is a rock-shaft 14, having crank-arms 15, connected by links 16 with the valves 17 in the seed-tubes. The sprocket 13 has a pin 18, which is adapted at each revolution to strike an arm 19 on the rock-shaft 14 and thereby to rock said shaft, which operates to open the valves 17 and permit the seed to drop. The rock-shaft 14 has rigid arms 20, connected by pivoted links 21 with the pivoted arms 22, the latter having the markers 23 secured thereon. At each actuation of the valve 17 the arms 22 are depressed, thus forcing the markers down near the heel of the shoe and causing them to penetrate the surface of the soil sufficiently to leave a visible mark, which mark will be in line transversely with the seed deposited on each side of the planter. I prefer to duplicate these markers on each side of the machine, so that a visible mark will be made opposite each hill.

The links 21 and the arms 22 may each be provided with a series of holes and connected by pins, so that the marker may be adjusted, as desired, to correspond to the adjustment of the dropping mechanism.

Instead of the precise arrangement of levers and shafts any other suitable arrangement may be made.

In order to return the rock-shaft after each actuation of the valves and markers, a retractile spring 24 is employed; but it will be understood that instead of the pin, arm, and spring, cams or any other suitable gearing may be employed to actuate the markers at regular intervals, or, if preferred, the marking attachment may be thrown out of action during the progress of the machine across the field.

I have shown the sprocket 13 mounted upon a hanger or support 25, secured on the runner-frame, and this is preferred, because the sprocket 13 should maintain a constant relative position to the trip-arm 19. The runner-frame will vibrate on passing over uneven ground, and in consequence the sprocket-chain 9 may become slack. To prevent the sprocket 18 from being affected by the movement of the sprocket 9 during these vibrations, I prefer to employ the friction-brake which is shown in Figs. 1 and 3. The wheel 26, having a grooved face, is secured to rotate with the sprocket 13, and a lever 27 is provided on the casting 28, the opposite end of the brake-lever being controlled by a spring 29. In order to clear obstacles from the path of the runners, I have provided obliquely-set clearers 30, which may be metal plates curved in cross-section and carried by the stems or standards 31, which are slidably mounted in the bifurcated ends 32 of the bracket 33, secured to the runner-frame. These clearers or plows may be so set that the heels thereof will cut into the surface, as shown in Fig. 2, to insure the removal of surface obstacles of the sort usually encountered in the operation of the machine. The clearers, however, upon meeting an unyielding obstacle will rise, their stems sliding upward in the bearings, and the downward movement of said stems being limited by the collars 34.

The manner of using a machine having my marking attachment will be obvious without extended explanation. It is only necessary in starting the machine to observe that the seed-tubes are in transverse alinement with the previously-planted rows, and then in proceeding across the field the marks will be made in line; but, as before stated, it being only necessary to start the machine right, the marking devices may be thrown out of action in crossing the field.

The uses of my invention will be readily understood. By it the expense of check-row wires and the trouble of setting them is entirely avoided, and this marking attachment may be applied to any of the standard makes of seed-planters and may, as above stated, be embodied in various forms. It might also be used in connection with hand-droppers as well as with geared droppers.

While I have shown a vertically-vibrating marker, it is obvious that the markers might be arranged to rotate or oscillate.

Having thus described my invention and the practicable means of effecting the same, and without limiting my invention to structural details, I claim—

1. A check-row attachment for corn-planters comprising in combination with the feed-disks, a shaft for operating said disks, the main shaft, sprocket-wheels on said main shaft and feed-disk shaft, a chain passing over said sprocket-wheels, an intermediate sprocket-wheel driven by said chain, a pin on said intermediate wheel, a rock-shaft having a rigid arm adapted to be engaged by the pin, a pivoted arm having the marker rigidly attached thereto and a second arm secured on the rock-shaft and connected to the pivoted arm by a link, whereby at each rotation of the sprocket-wheel, said marker is depressed to penetrate the soil, substantially as described.

2. In a check-row attachment for corn-planters, the combination with a sprocket-chain connecting the main axle and the feed-disk shaft, of a sprocket-wheel actuated by said chain, markers connected with and operated by said sprocket-wheel in unison with the dropping devices and a brake mechanism acting on said sprocket-wheel to prevent its being affected by the vibrations of the sprocket-chain, substantially as described.

3. In a check-row attachment for corn-planters, the combination with a runner-frame having runners, a dropping mechanism mounted on the runner-frame and markers located outside of the runner-frame laterally thereof and actuated by the dropping devices to produce a visible mark adjacent to the path of said runners, of yielding clearers arranged in front of and in line with said markers to remove obstacles from the path thereof, substantially as described.

HENRY WILLIAM DEUTSCHER.

Witnesses:
O. D. BROWNELL,
J. J. MICHAEL.